US005662722A

United States Patent [19]

Shiban

[11] Patent Number: 5,662,722

[45] Date of Patent: Sep. 2, 1997

[54] AIR AND GAS MIXING APPARATUS WITH REMOVABLE BAFFLE PLATES

[75] Inventor: Samir S. Shiban, Beaverton, Oreg.

[73] Assignee: Innovative Engineering Solutions, Inc., Beaverton, Oreg.

[21] Appl. No.: 509,829

[22] Filed: Aug. 1, 1995

[51] Int. Cl.$^6$ ........ B01D 45/08

[52] U.S. Cl. ........ 55/413; 55/427; 55/436; 55/439; 55/446; 55/465

[58] Field of Search ........ 55/413, 415, 416, 55/427, 428, 434, 436, 437, 439, 443, 445, 446, 465

[56] References Cited

U.S. PATENT DOCUMENTS

| | | | |
|---|---|---|---|
| 1,117,174 | 11/1914 | Farmer | 55/446 X |
| 1,783,143 | 11/1930 | Schrempp | 55/446 |
| 1,917,857 | 7/1933 | Searles | 55/436 |
| 2,213,911 | 9/1940 | Highhouse | 55/443 X |
| 2,347,728 | 5/1944 | Bell | 55/436 |
| 2,467,346 | 4/1949 | Trubenbach | 55/436 X |
| 3,634,053 | 1/1972 | Klass | 48/195 |
| 3,692,055 | 9/1972 | Benner et al. | 137/604 |
| 4,042,355 | 8/1977 | Pearson | 55/443 X |
| 4,078,576 | 3/1978 | Punch et al. | 137/604 |
| 4,955,990 | 9/1990 | Napadow | 55/446 X |
| 5,292,432 | 3/1994 | Jainek et al. | 210/445 X |
| 5,353,829 | 10/1994 | Shiban | 137/88 |

*Primary Examiner*—Robert Spitzer
*Attorney, Agent, or Firm*—James D. Givnan, Jr.

[57] ABSTRACT

A housing receives ambient air through an inlet located so as to direct the airflow against blades of a rotor which disperses the airflow. A gas inlet conduit discharges hazardous gas into a chamber of the housing. The dispersed airflow acts on the hazardous gas entering the chamber to disperse and mix with the gas. The mixed air and hazardous gas flow impinges against a wall surface of the housing prior to discharge from the housing via an outlet conduit. A source such as the intake side of a blower induces the flow of air and hazardous gas through the housing and the outlet conduit. The rotor is located near an air inlet of the housing for rotor operation by airflow drawn into the housing. A flow sensor and damper control system are provided. Baffle assemblies are removably installed in the housing and include apertured plates which collect particles deposited by the mixed air and gas flow. Bypasses are provided to ensure an uninterrupted mixed air and gas flow past the baffle plates.

4 Claims, 1 Drawing Sheet

AIR AND GAS MIXING APPARATUS WITH REMOVABLE BAFFLE PLATES

BACKGROUND OF THE INVENTION

The present invention pertains generally to an apparatus for mixing ambient air with various hazardous gases such as that apparatus shown in U.S. Pat. No. 5,353,829 issued Oct. 11, 1994 to the present inventor.

In the above noted patent, an apparatus is disclosed for the mixing of ambient air with hazardous gases to the extent the gases are rendered inert with respect to flammability and/or explosion and achieves homogeneous mixing of toxic and corrosive gases with air. This complete mixing insures that minimum concentrations of hazardous gases with atmospheric air is achieved. Great care must be exercised in the handling of various toxic, corrosive and explosive gases, and accordingly, the apparatus described in the above noted patent achieves mixing of air and hazardous gases without reliance on electrical components and/or other components susceptible to corrosion.

In some hazardous gases particulate is suspended, which preferably is removed from the gas/air mixture prior to passage of the mixture through a scrubber and ductwork leading to scrubber or other sources of low pressure serving to induce a gas and air flow through the mixing apparatus.

SUMMARY OF THE PRESENT INVENTION

The present invention is embodied within a mixing apparatus which serves to create a homogeneous mixture of hazardous gases with air by the addition of ambient air with the resulting mixture being directed through multiple barriers each of a perforate nature.

Air and hazardous gas flows are induced into a housing of the present apparatus whereat mixing occurs. A rotor assembly serves to impart a swirling motion to an incoming air flow to enhance mixing of same with a hazardous gas with the mixture subsequently directed toward an array of baffle plates. The baffle plates define a multitude of openings causing further random currents to the mixed air and gas resulting in the deposit of particles on baffle surfaces with virtually no pressure drop across the plates. The baffles are provided as unitary structures for periodic servicing and installation back in the apparatus. At intervals the baffle plates are withdrawn, cleaned and reinstalled within the mixing apparatus.

Important objectives include the provision of baffle plates in a mixing apparatus wherein air and a hazardous gas are mixed to provide an inert combination with the plates collecting oxides and other products of reaction deposited from the mixture with minimal impedance of an induced flow through the apparatus; the provision of baffle assemblies positioned in place and retained in a chamber of the apparatus by support means, in a precise manner which also facilitates convenient assembly removal and reinstallation.

DESCRIPTION OF THE PREFERRED EMBODIMENTS

Figure 1:
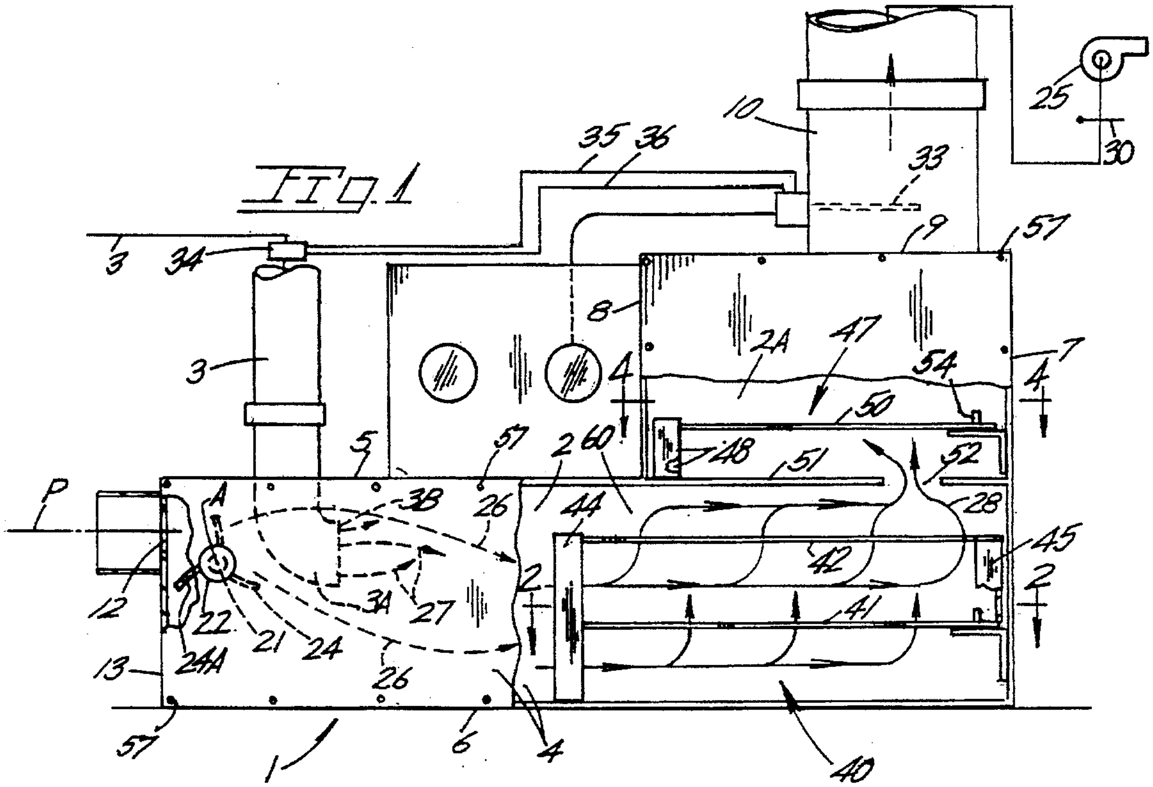
FIG. 1 is a side elevational view of a mixing apparatus equipped with the present invention.
Figure 2:
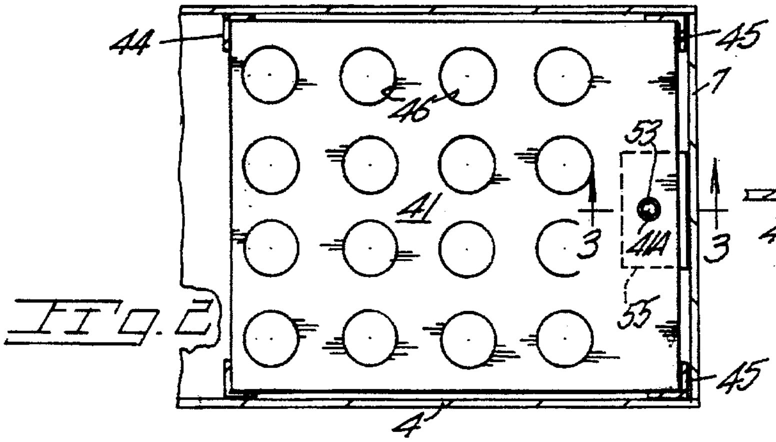
FIG. 2 is a horizontal sectional view taken along line 2—2 of FIG. 1.
Figure 3:
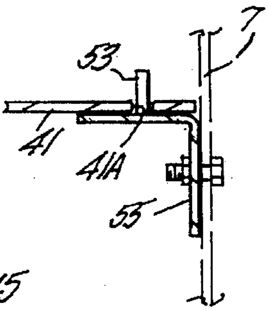
FIG. 3 is a vertical sectional view taken along line 3—3 of FIG. 2.
Figure 4:
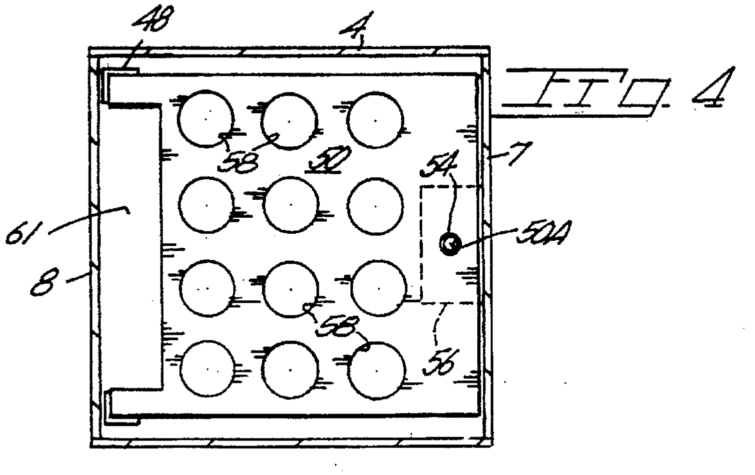
FIG. 4 is a horizontal plan view taken along line 4—4 of FIG. 1.

With continuing attention to the drawings, wherein applied reference numerals indicate parts similarly hereinafter identified, the reference numeral 1 indicates generally a housing defining a chamber 2 receiving a flow of hazardous gas via an inlet conduit 3.

The housing 1 comprises a pair of sidewalls at 4, a top wall 5 and a bottom wall 6. An upright end portion 2A of the chamber is defined by the housing sidewalls 4, an end wall 7, an intermediate wall 8 and a second top wall 9. An outlet duct is at 10. Housing 1 is preferably of stainless steel construction to handle a range of hazardous gases entering via inlet conduit 3.

Ambient air inlet means at 12 is located in an end wall 13 of the housing to receive air for subsequent mixing with the hazardous gas entering via inlet conduit 3. Conduit 3 extends internally of the housing and is provided with a curved end portion 3A terminating internally of the housing in an outlet end 3B.

In housing 1 is a rotor assembly including a shaft 21 journalled in bearings in sidewall mounted collars 22. Said shaft carries multiple blades as at 24 each shaped so as to move in response to incoming air entering via housing ambient air inlet 12. Blade apertures 24A contribute to dispersing the air.

Air inlet 12 is located so as to direct air drawn into housing toward a blade 24 on shaft 21 to drive the rotor assembly and more specifically impart turbulence to the incoming flow of ambient air which is induced into chamber 2 by a fan or scrubber at 25. Preferably the blades 24 are backward curved relative their direction of rotation about an axis A. Such blade imparted turbulence is shown by dashed arrows at 26. The turbulent air flows past outlet 3B of hazardous gas inlet 3 results in the hazardous gas being dispersed per the dashed arrows at 27 as it mixes with turbulent air 26. Such mixing continues as the mixture moves along chamber 2. Further mixing occurs at 28 when the mixed gas flow encounters wall 7 of the housing. The flow is drawn upwardly toward outlet duct 10 in communication with a reduced pressure source area such as the inlet of a fan or scrubber unit 25.

A damper 30 in duct 10 is preferably of the locking type and regulates mixed gas flow through housing 1 and duct 10. Air flow through outlet duct 10 is monitored by a flow sensor unit 33 in circuit with an air inlet valve 34 to terminate hazardous gas flow in inlet 3 upon detection of a reduced mixed flow in outlet duct 10. The airflow through outlet duct 10 should be within 100 CFM to 250 CFM. The ratio of hazardous gas to airflow may vary to best treat the hazardous gas being processed. Additional sensors and control elements, if so desired, will be readily apparent to those skilled in the art. A valve control circuit includes leads 35–36 from sensor unit 33.

Inlet means 12 has a medial plane P which is offset from rotor shaft axis A to ensure inlet air impinging against rotor blades 24 in a successive manner. The blades, preferably apertured, disperse the airfow into diverse currents which act on the hazardous gas flow discharged from conduit end 3B and mix with same to the extent noted above to render same inert.

The following gases are some of the hazardous gases that may be treated with the present apparatus:

Hydrogen (flammable)

Monosilane "

Buterie "

Phosphene (toxic)

Germane "

Chlorine "

Silane (pyrophoric)

Dichlorosilane (corrosive/pyrophoric)

Chlorine trifluoride (corrosive)

Hydrogen chloride "

With regard now to the baffle structure disposed in chamber 2, a baffle assembly generally at 40 has baffle plates 41–42 preferably of stainless steel, spaced from one another and above bottom wall of the mixing apparatus. Supports at 44–45 serve to position and join the plates to permit the air and gas mixture to pass through openings as at 46 in the plates. Particles, such as oxides, in the mixed flow of a gas and air, will be deposited on oppositely disposed surfaces on each plate. Similarly a second baffle assembly, generally at 47, includes supports at 48 to space a plate 50 from a partition of the apparatus. The partition has an aperture at 52. Plate 50 has a multitude of openings at 58 for the mixed air and gas flow. Both baffle assemblies 40 and 47 are removably retained securely in place within the apparatus housing by means of posts at 53 and 54 of wall mounted brackets 55 and 56 and which posts project through apertures 41A and at 50A in baffle plates 41 and 50 to allow plate disengagement upon lifting of the assemblies and subsequent removal of same through an open area resulting from the removal of side wall 4 upon removal of fasteners 57. The posts retain the baffle assemblies 40 and 47 in abutment with end wall 7 of the apparatus avoiding shifting of the assemblies.

Indicated at 60 and 61 are bypasses with bypass 60 between baffle plate 42 and partition 51 of the apparatus while bypass 61 is defined by baffle plate 50 and upright intermediate wall member 8 of the apparatus. The bypasses ensure a continuous open passageway for a mixed air and gas flow should deposits on the plate members restrict plate defined openings 46 and 58 preferably two inches or so in diameter.

While I have shown but one embodiment of the invention, it will be apparent to those skilled in the art that the invention may be embodied still otherwise without departing from the spirit and scope of the invention.

Having thus described the invention, what is desired to be secured by a Letters Patent is:

1. In an air and hazardous gas mixing apparatus having a chamber defined by walls, the improvement comprising, perforate metal plate members each defining a multitude of apertures, said plate members each having oppositely disposed surfaces thereon for the deposit of particles resulting from the reaction of air mixing with a hazardous gas, and support means supporting said plate members in a fixed manner relative said walls and permitting removal and reinstallation of the plate members, said support means including retention means in inserted engagement with one of said plate members, said retention means including a post, said post located in the apparatus chamber in a manner to locate said plate members in abutment with at least one of said walls of the apparatus.

2. In an air and hazardous gas mixing apparatus having a chamber defined by walls, the improvement comprising, perforate metal plate members each defining a multitude of apertures, said plate members each having oppositely disposed surfaces thereon for the deposit of particles resulting from the reaction of air mixing with a hazardous gas, and support means supporting said plate members in a fixed manner relative said walls and permitting removal and reinstallation of the plate members, said plate members and said support means comprise multiple baffle assemblies, retention means for each of said baffle assemblies including a post, said post located in the apparatus chamber in a manner to locate each of said baffle assemblies in abutment with one of said walls of the apparatus.

3. The improvement claimed in claim 2 wherein one of said metal plate members partially defines a bypass for an air and gas mixture.

4. The improvement claimed in claim 2 wherein some of said plate members define bypasses for an air and gas mixture flow.

* * * * *